United States Patent [19]

Pawelka

[11] 4,286,699
[45] Sep. 1, 1981

[54] DUAL FUNCTION HANDGRIP CONTROL

[76] Inventor: Gustav J. Pawelka, Box 612, Sedona, Ariz. 86336

[21] Appl. No.: 109,783

[22] Filed: Jan. 7, 1980

[51] Int. Cl.³ .............................................. B60K 41/20
[52] U.S. Cl. ...................................... 192/1; 192/3 S; 74/471 R; 74/504
[58] Field of Search .............. 192/1, 3 TR, 3 M, 3 S; 74/480 R, 471 R, 483 R, 491, 551.9, 504, 520

[56] References Cited
U.S. PATENT DOCUMENTS

| 2,777,335 | 1/1957 | Engberg et al. | 192/3 S |
| 3,845,847 | 11/1974 | Camp | 192/3 S |
| 3,958,677 | 5/1976 | Spanelis | 192/3 S |

Primary Examiner—George H. Krizmanich
Attorney, Agent, or Firm—McAulay, Fields, Fisher, Goldstein & Nissen

[57] ABSTRACT

A dual function handgrip control, permits independent operation of two functions from a single handgrip, such as both the throttle and front brake mechanism of a motorcycle, by manipulation of a single handgrip control. For motorcycle use, the handgrip control includes a handgrip which is rotatably mounted on the handlebar and connected to the throttle mechanism of the motorcycle, through a lost motion connection and to the brake operating lever. Separate control of the throttle and brake mechanisms is thereby accomplished.

7 Claims, 5 Drawing Figures

DUAL FUNCTION HANDGRIP CONTROL

BACKGROUND OF THE INVENTION

The present invention relates generally to a dual function handgrip control mechanism and more particularly, pertains to a motorcycle control for the sequential operation of the motorcycle throttle and front brake mechanisms by the operation of a single handgrip control.

Motorcycles are normally provided with a handlebar mounted rotatable throttle mechanism and a separate leveractuated front wheel brake mechanism, both of which are located at the same end of the handlebar. The rear wheel brake is normally actuated by means of a separate foot pedal. Thus, with rare exceptions, one must apply the front and rear brakes of a motorcycle independently of each other by use of both a foot pedal and a hand lever. When the operator wishes to decelerate or stop, the throttle handgrip is released and allowed to return to a neutral or throttle idle position by a throttle spring mechanism. However, to apply the front brake with the same hand that operates the throttle handgrip, one must release the handgrip, reach out and pull on the brake actuating lever. Simultaneously the rear brake should also be applied by means of the foot pedal.

The front brake of a motorcycle provides more than double the braking power of the rear brake. Thus, simultaneous application of the front and rear brakes of a motorcycle will result in maximum braking, with the front brake carrying the main braking load and the rear wheel adding additional braking force and acting as a stabilizer.

However, for most casual riding circumstances, the foot pedal-actuated rear brake is generally used to bring the motorcycle to a stop with safety. That is, most casual riders are reluctant to release their grip on the handlebar for fear they will lose steering control. As a result, many motorcycle riders simply do not regularly use their front brakes. For these riders, the use of the front brake does not become an automatic or reflex action and, in an emergency wherein the front brake may mean the difference between a crash and stopping in time, the front brakes are not applied and a crash may occur if evasive action is unavailable. Recent studies in California, funded by the Department of Transportation, confirm that many motorcycle riders perceiving a potential collision have difficulty avoiding it. Most will lock up the rear wheel and underbrake the front wheel.

Many safety conscious experienced recreational riders, and riders driving in off-the-road or other competition races, will ride with two fingers extended outwardly and partially hooked or circled around the hand brake actuating lever. This position has the advantage that the hand brake is readily and quickly operable and can be applied in an emergency situation. However, this may mean that one has a less than fully secure grip on the handlebars during normal riding conditions or an emergency. In addition, a rider with small hands or less strong grip, may find the riding position with outstretched fingers uncomfortable or impossible. In fact, many women riders and men riders as well may find it difficult to ride with their hands in this position while maintaining an adequate handlebar grip, especially under off-the-road competition riding conditions.

A dual function control handgrip can be used, in general, for use where a linear pull signal and a rotary "twist" signal can be adapted to operate various controls. Application to mopeds, analogous to that in motorcycles, is immediately obvious. Acceleration and brake mechanisms of self-propelled lawn mowers, can also be easily adapted for use with a dual control handgrip mechanism. Go-cart vehicles, power boats, automobiles for persons unable to use their legs, and any of a large number of other devices can be adapted for control by a dual control handgrip generating a distinct linear pull force and rotary "twisting" force.

With respect to motorcycles, it is known to provide a means to couple the front and rear hydraulic brakes to a single foot operated mechanism whereby both brakes are operated simultaneously. However, this is relatively expensive, does not apply to mechanical brakes, and is only known to have been used by one manufacturer.

It is therefor an object of the present invention to provide a dual function control handgrip generating two distinct sequential operating signals.

It is a further and related object of the present invention to provide an inexpensive and conveniently operated motorcycle control which permits a motorcyclist to operate both the throttle mechanism and the front brake mechanism of a motorcycle by manipulation of a single handgrip. The present invention is simple to operate and can be designed as original or optional equipment applied at the time of manufacture, or for easy retrofitting onto existing motorcycles or other suitable mechanisms.

BRIEF DESCRIPTION OF THE DISCLOSURE

A motorcycle control according to the present invention is a handlebar mounted handgrip connected to the throttle mechanism of a motorcycle through a lost motion connection. The connection is operable to connect the handgrip to the throttle mechanism both when the handgrip is rotated in a throttle-open direction to open the throttle and, also, when the throttle mechanism and handgrip are driven back to its neutral or idle position by the throttle return spring. Manual rotation of the handgrip in the other direction past its neutral position causes the lost motion connection to disengage the handgrip from the throttle.

The handgrip is also connected to the front brake actuating lever or other brake actuating mechanism through a brake operating device. The brake operating device actuates the front brake through the lever in response to the rotation of the handgrip past its neutral position in a direction opposite to the throttle-open position.

The lost motion connection comprises a pin and pin stop mechanism wherein rotation of the handgrip drives the pin and pin stop into abutment, thereafter carrying the throttle mechanism. This abutting relationship is maintained by the reverse pressure of the throttle return spring, until release of the handgrip allows the spring to return the throttle to its idle position. Rotation of the handgrip in the reverse direction disengages the pin and stop, and therefore disengages the handgrip from the throttle mechanism. A second pin stop can be provided as a fail-safe measure in the event of the failure of the throttle spring. This permits closing the throttle manually by the reverse direction rotation of the handgrip.

The brake operating device converts rotary handgrip motion to a linear pull or push by use of a cam and chain device, or an over-the-center toggle.

DESCRIPTION OF THE PREFERRED EMBODIMENT

Figure 1:
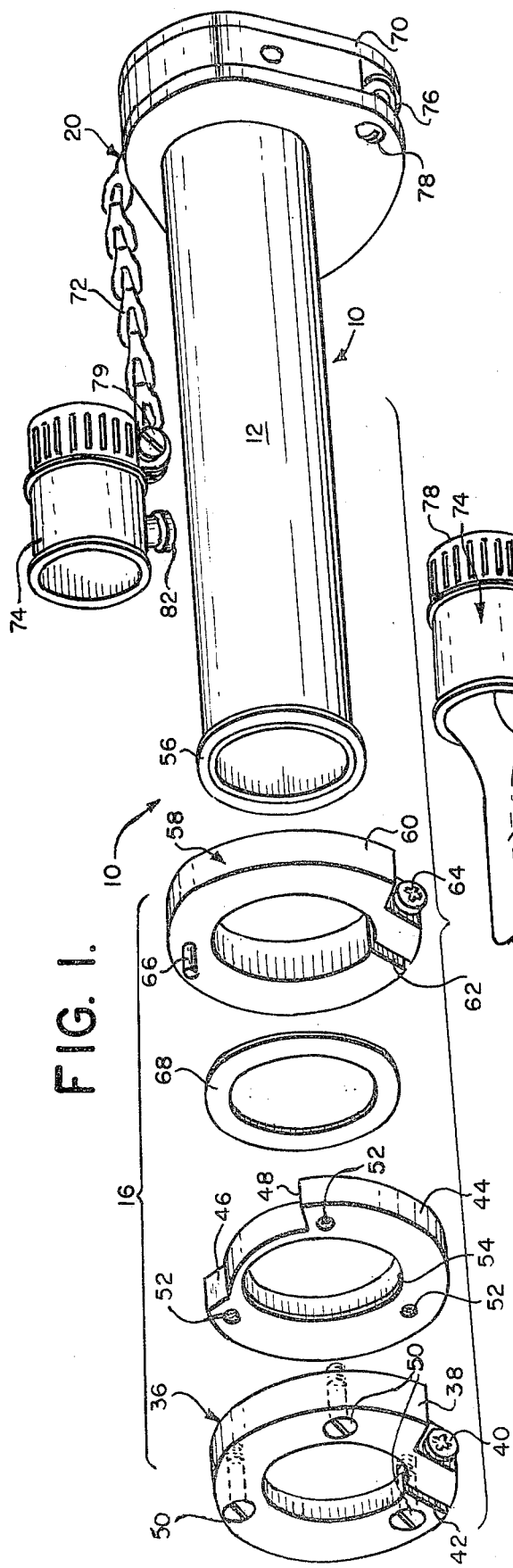
FIG. 1 is an exploded view of a motorcycle control mechanism constructed according to the present invention.
Figure 2:
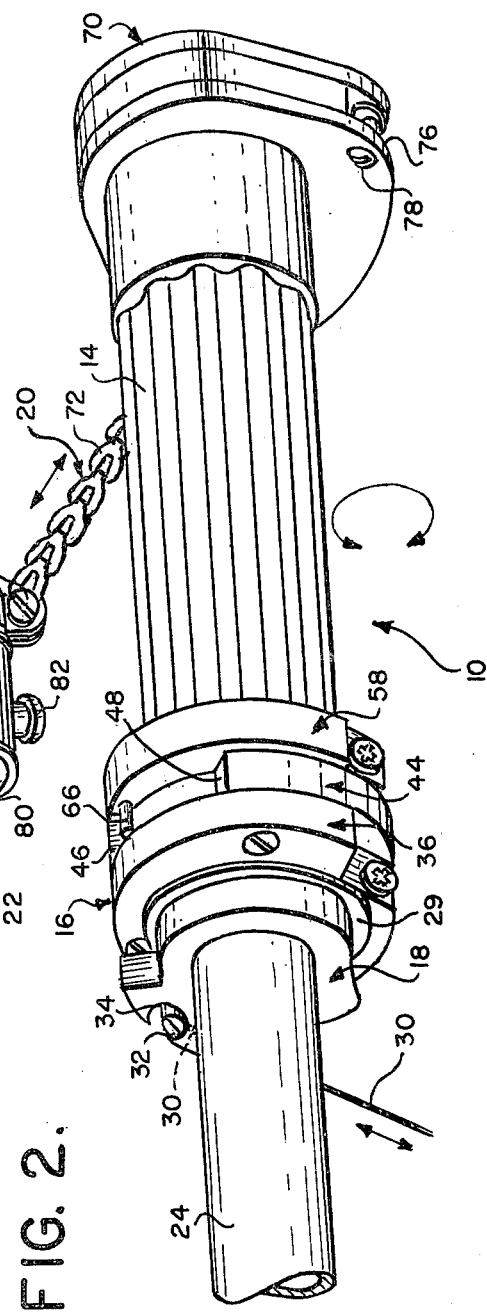
FIG. 2 is a perspective view of the motorcycle control of the present invention in place on a motorcycle handlebar.
Figure 3:
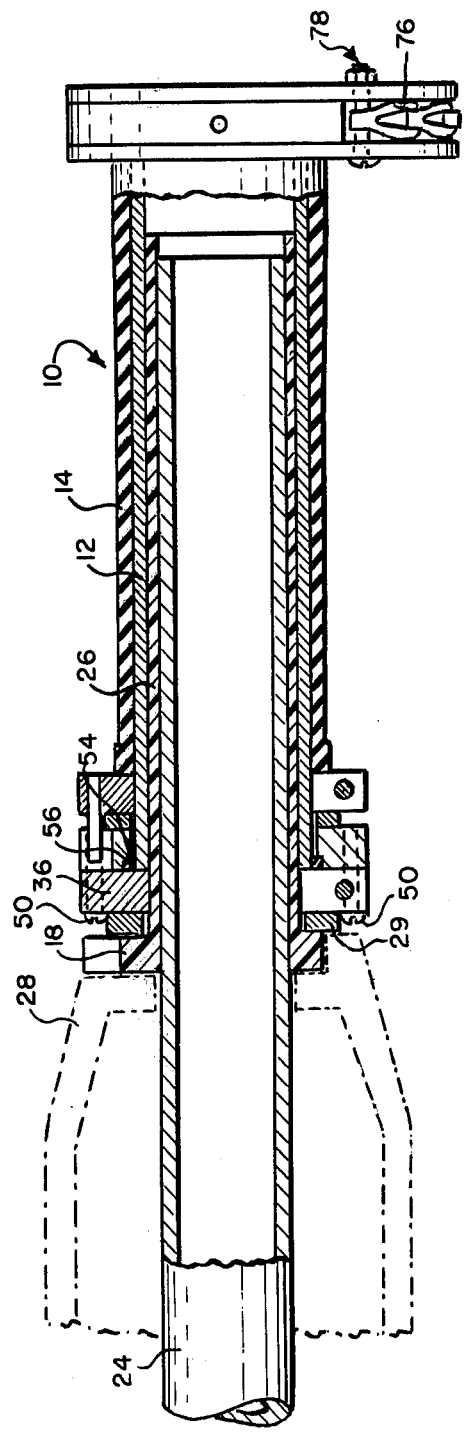
FIG. 3 is a vertical sectional view of the motorcycle control mechanism shown in FIG. 2.

With reference to the FIGS. 1-3, a motorcycle control mechanism 10 has a handgrip tube 12, preferably covered with a rubber or other high friction tube covering surface 14 (FIG. 2), as is usual in the art to provide a better hand hold. Near one end of the handgrip tube 12 is a lost motion mounting means 16 which mounts the handgrip tube 12 on the handlebar motorcycle throttle activating mechanism 18. At the other end of the handgrip tube 12 is a brake operating device 20 which connects the handgrip tube 12 to the brake activating or actuating lever 22.

As illustrated in FIGS. 2 and 3, the motorcycle control mechanism of the present invention 10 receives therein the end of a standard motorcycle handlebar 24 and motorcycle throttle cable tube 26 on which is supported a motorcycle throttle activating mechanism 18. These are the usual standard devices normally employed on motorcycles. A standard protective housing 28 (FIG. 3) is shown also normally deployed over the throttle activating mechanism 18 for protection thereof. Spacer 29 (FIG. 3) of the control mechanism 10 provides clearance for housing 28. Usual motorcycle throttle mechanisms are operated by pulling or releasing a throttle cable 30 (FIG. 2) which operates against a biasing spring in the motorcycle throttle mechanism (not shown). The end 32 of throttle cable 30 is retained in a socket 34 formed in throttle activating mechanism 18. As is usual for the operation of a motorcycle throttle mechanism, rotation of throttle cable tube 26 from its neutral position in a normally counterclockwise direction carries throttle activating mechanism 18 which in turn pulls on throttle cable 30 to open the motorcycle throttle mechanism (not shown). Release of the handgrip also causes release of throttle activating mechanism 18 and thereby releases throttle cable 30 which is pulled in the reverse direction by the throttle return spring (not shown) until the throttle is returned to its idle position, concommittantly carrying the throttle tube 26 counterclockwise back to its neutral position. As will be seen from the detailed discussion below, this basic operation is essentially unchanged when accomplished by a device according to the present invention.

The front brake mechanism of a motorcycle is normally also activated by pulling on a cable or applying pressure on a hydraulic piston. However, the force is applied through a brake activating lever 22 which is pulled by the fingers toward handlebar 24 about a pivot (not shown). The brake cable (not shown) is secured to the other end of brake activating lever 22, on the other side of the pivot or the lever acts on the hydraulic piston. As with the throttle mechanism, a spring device on the brake returns the brake to its neutral (or open) condition when the brake lever 22 is released. This basic operation is also unchanged by employment of the preferred embodiment of the present invention.

Motorcycle control mechanism 10 of the present invention is clamped to throttle cable tube 26 with a stop clamp 36. As illustrated in the drawings, the clamp 36 may be in the form of a split ring 38 which is tightened by bolt 40 received in a threaded socket (not shown) to close gap 42, as required to secure stop clamp 36 to throttle cable tube 26. A stop ring 44 carrying first and second circumferentially spaced stops 46, 48 is bolted to stop clamp 36 with bolts 50 which are received in threaded sockets 52. As will be realized from the description of the operation of the device (infra) only one stop is required for operation on any particular motorcycle. More specifically, with reference to FIG. 2, with a usual throttle mechanism requiring a counterclockwise rotation for activation, only second stop 48 is required. For a throttle mechanism activated by clockwise rotation, only first stop 46 is required. However, both stops are preferably provided to provide a fail-safe device if the throttle return spring is accidentally disabled. In the case of a disabled return spring, driving the pin 66 against the normally unused stop (46 or 48) will permit manual closing of the throttle mechanism—as can be done with prior throttle control handgrips.

The inner edge 54 of stop ring 44, which faces first clamp 36, is beveled or recessed to rotatably receive flange 56 carried on the end of handgrip tube 12 (FIG. 1). This rotatably mounts stop clamp 36 and stop ring 44 on the end of handgrip tube 12 over flange 56.

A pin clamp 58, generally similar in construction to stop clamp 36, includes a split ring 60 with a gap 62 closed by bolt 64 received in a threaded socket (not shown) to close gap 62, is also provided. Pin clamp 58 also carries a projection such as pin 66 which is operable to engage first stop 46 or second stop 48.

Pin clamp 58 is clamped to handgrip tube 12 in close proximity to stop ring 44 (FIGS. 2 and 3). Pin clamp 58 is nonrotatable with respect to handgrip tube 12. A spacer ring 68, preferably of a low friction plastic such as nylon or polytetrafloroethylene is preferably disposed between pin clamp 58 and stop ring 44 to reduce friction therebetween. As noted above, stop clamp 36 and stop ring 44 are rotatably mounted on handgrip tube 12 while pin clamp 58 is fixedly mounted on handgrip tube 12. Therefore rotation of handgrip tube 12 with respect to stop clamp 36 and stop ring 44 will cause pin clamp 58 also to rotate relative thereto bringing pin 66 into abutting engagement with either first stop 46 or second stop 48, depending on the direction of relative rotation. Thereafter, continued rotation in the same direction will cause stop clamp 36 and stop ring 44 to be rotated with handgrip tube 12. A change in direction of rotation of handgrip tube 12 will release stop clamp 36 and stop ring 44 from engagement therewith through pin 66. The following discussion assumes that the device is to be used with a motorcycle and that the usual counterclockwise rotation is required to open the motorcycle throttle mechanism.

The operation and "feel" of the motorcycle throttle mechanism is generally the same as with prior art handgrips for both embodiments, except that there is lost motion between handgrip tube and the throttle mechanism.

With the first embodiment, handgrip tube 12 rotates freely until pin 66 engages stop 48 (with reference to FIG. 2). Thereafter continued rotation of the handgrip tube 12 (or tube covering 14) in a counterclockwise direction (pin 66 toward second stop 48 in FIG. 2) will cause stop clamp 36 to be rotated in a counterclockwise direction. As stop clamp 36 is clamped to throttle activating mechanism 18, a pull will be exerted on throttle cable 30 and the motorcycle throttle mechanism opens. Loosening the hold on handgrip tube 12 (or tube covering 14) will permit the throttle return spring (not shown) to pull throttle cable 30 in the opposite direction, thereby rotating throttle activating mechanism 18 in a clockwise direction with concommittant rotation of stop clamp 36 and stop ring 44 also in a clockwise direction. Further, because pin 66 is in engagement with second stop 48, pin clamp 58 will also be carried in a clockwise direction as will handgrip tube 12. In this respect, the "feel" of the motorcycle control mechanism 10 to the motorcycle rider, will be essentially the same as with prior art control mechanisms. However, after the throttle spring has returned the throttle to its neutral position, it is possible to manually rotate handgrip tube 12 further in a clockwise direction without affecting the throttle mechanism, or applying any forces thereto, at least until pin 66 engages first stop 46. It is this "lost" or "free" motion which the present invention employs to provide a brake activating force after the throttle mechanism has returned to its neutral or idle position.

It is noted that, if the throttle spring fails, the throttle can be manually driven to a closed position by manually rotating handgrip 12 in a clockwise direction so that pin 66 engages first stop 46 and thereafter closes the throttle mechanism while applying the brakes—to provide a fail-safe function.

The brake activating force is provided by means of brake activating device 20. Brake activating device 20 includes an eccentric cam 70, an elongated connection such as chain 72 and a brake lever activating device such as lever clamp 74.

Cam 70 includes a chain receiving groove 76 formed in the periphery thereof to receive chain 72. Chain 72 is secured at one end of groove 76 by a nut and bolt 78 or other convenient means. Cam 70 is mounted on the end of handgrip tube 12 opposite the end on which stop clamp 36 and stop ring 44 are secured. As illustrated in the drawings, the eccentricity of cam 70 is such that chain groove 76 is along the larger radii or lobe with respect to handgrip 12. In this way, rotation of cam 70 to receive chain 76 in groove 76 will cause a greater amount of chain 76 to be wound around cam 70, than rotation in the opposite direction. To be more specific, with respect to FIG. 2, the usual rotational direction for cam 70 to receive chain 76 in cam groove 76, is clockwise. However, the chain length is selected so that the chain will not be rotated on the cam until the handgrip 12 is rotated in the clockwise direction beyond the neutral or idle position of the throttle mechanism.

Chain 76 is secured to lever clamp 74 by any convenient means such as bolt 79. Lever clamp 74 also includes a lever receiving socket 80 which receives the end of brake activating lever 22 and is secured thereto by set screw 82.

As can be seen in FIG. 2, rotation of cam 70 in a clockwise direction causes chain 72 to be received in groove 76 and be wound around cam 70, thereby pulling brake activating lever 22 toward handlebar 24, to activate the motorcycle's front brake mechanism. However, rotation of cam 70 in a counterclockwise direction will not produce the same result because of the eccentric design of cam 70, (i.e., a small lobe at the other end of the cam). The eccentricity of cam 70 takes up enough chain 72 to fully activate the front brake mechanism when cam 70 is rotated in a clockwise direction less than the angular distance between first and second stops 46, 48.

When fitted to a motorcycle, the motorcycle control mechanism is preferably adjusted so that substantially all of the slack in chain 72 is taken up by cam 70 when the motorcycle throttle mechanism is in its idle position. This is easily accomplished by loosening stop clamp 36 to permit the throttle mechanism spring to return the throttle mechanism to its idle position. The motorcycle control mechanism can then be rotated clockwise to take up the slack in chain 72 and thereafter, stop clamp 36 is tightened on throttle cable tube 26.

To summarize the operation of this embodiment when fitted to a motorcycle, the handgrip tube 12 is rotated in a counterclockwise direction until pin 66 engages second stop 48. Thereafter continued counterclockwise rotation opens the motorcycle throttle by pulling on throttle cable 30. This is accomplished, as described above, through stop ring 44 which is secured to stop clamp 36, which is in turn secured to the throttle activating mechanism 18. Loosening the grip on handgrip tube 12 will permit the throttle mechanism spring to pull cable 30 and return the throttle mechanism to its idle position. This carries the motorcycle control mechanism back to its initial or neutral position with cam 70 taking up substantially all of the slack in chain 72. Thereafter, further manual rotation of handgrip tube 12 in the clockwise direction, will cause cam 70 to take up additional chain as pin 66 moves away from engagement with second stop 48 and releases the handgrip tube 12 from the throttle mechanism.

The continued clockwise rotation of handgrip tube 12 also causes cam 70 to wind-up chain 72. This pulls brake activating lever 22 toward handlebar 24 through chain 72 and brake lever engaging device 74, until the front brakes are applied. Alternatively, this force can be applied directly or indirectly to the piston of a hydraulic brake system. Thereafter, loosening the grip on the handgrip tube 12 permits the front brake spring mechanism to return lever 22 to its neutral position thereby pulling chain 72 to unwind chain 72 from cam 70. This rotates cam 70 back to its initial position carrying the handgrip tube 12 and the device 10 is ready to accelerate or brake the motorcycle as required.

Figure 4:
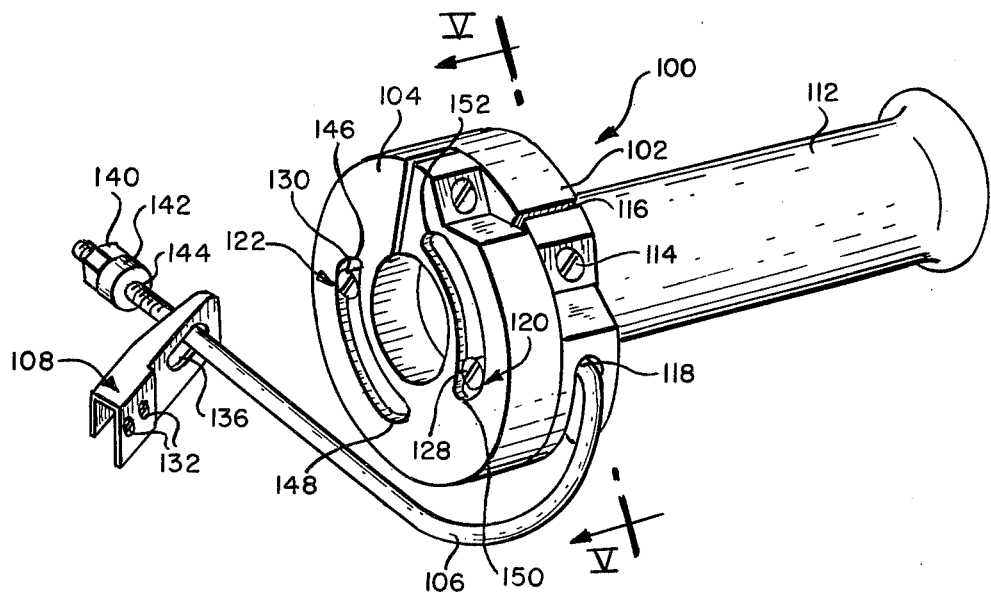
FIG. 4 is a perspective view of a modified embodiment of the present invention.
Figure 5:
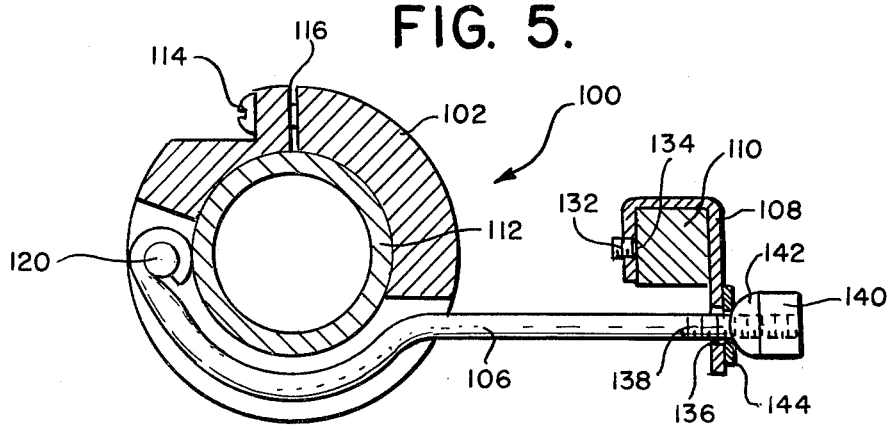
FIG. 5 is a sectional view taken through line V—V of FIG. 4 showing a brake lever in place.

A modified embodiment of a dual function handgrip control 100 which operates in a manner similar to that of the embodiment of FIGS. 1-3, is shown in FIGS. 4 and 5.

As illustrated in FIGS. 4 and 5, the handgrip control is comprised of a toggle crank split ring 102, a stop split ring 104, a curved toggle rod 106, and a brake lever clamp 108 to connect the toggle rod 106 to the brake lever 110 of the motorcycle.

Toggle crank split ring 102 is clamped to a handgrip tube 112 by tightening screw 114 in a threaded socket (not shown) to close split 116 as required.

A toggle receiving groove 118 is formed in toggle crank split ring 102, and is spanned at one end by a pivot pin such as pivot bolt 120 about which toggle rod 106 is pivotally secured.

Pivot bolt 120, preferably coupled with a second bolt 122, also operates as a stop pin clamp bolt. As shown in FIG. 4, these bolts 120, 122 pass through curved slots 124, 126 in which they are slidingly received. The heads 128, 130 of respective bolts 120, 122 secure split ring 104 to split ring 102 to form a unit, while the curved slots 124, 126 permit limited relative rotation of one of the split rings with respect to the other. As is readily realized by comparing this structure with that of the embodiments of FIGS. 1-3, this relative rotation of one split ring 102 with respect to the other 104, provides the lost motion action for the operation of the present invention. The ends 146, 148, 150, 152 of respective slots 124, 126 operate as stops analogous to stops 46, 48 of the first embodiment. Stop split ring 104 is clamped to the handlebar throttle activating mechanism 18 (not shown in FIG. 4) analogous to stop clamp 36 of the first embodiment (FIGS. 1-3).

The elongated connector for this embodiment to operate the brake lever 110, is curved toggle rod 106. Brake lever clamp 108 is secured to the brake lever using set screws 132 carried in tapped sockets 134 (FIG. 5). An opening 136 is provided through clamp 108 to receive the end of toggle rod 106. By threading the end 138 of toggle rod 106, adjustment for variations in the motorcycle arrangements can be provided using stop nuts 140, 142 and washer 144 arrangement.

Control of the throttle mechanism using this embodiment of the invention 100, is the same as with the embodiment of FIGS. 1-3. However, control of the brake mechanism with this embodiment has a number of advantages.

One advantage of the modified embodiment is the over-the-center toggle action available, as illustrated in FIG. 5. The toggle gives fast initial take-up on the brake lever, but provides a slower and increasingly stronger pull as the pivot pin 120 approaches the centerline of the toggle action of the device. Thus strong controlled braking is available. Furthermore, once pivot pin 120 passes over the centerline, the device locks the brake in its activated position. Thus a parking brake effect is available for the motorcycle.

While a preferred embodiment of the invention has been shown and described herein, it will be obvious that numerous omissions, changes and additions can be made therein without departing from the spirit and scope of the present invention. Thus, for example, although several lost motion connectors are shown and described, any connector providing equivalent lost motion can be substituted therefore. Similarly, other brake operating devices other than the two illustrated herein can be employed. As was mentioned above, the control can be modified to reverse relative operating rotational directions; or to be used to directly activate the brake mechanism when the device is provided at the time of manufacture. Although described with respect to the operation of a motorcycle, other uses have been disclosed and still further uses will be obvious to one of ordinary skill in the art. It is therefore not intended to limit the invention only to motorcycle use.

What is claimed is:

1. A dual control handgrip device for individually operating a first and a second device, comprising:
    a handgrip, including a gripping portion;
    first control means for operating an associated device in response to rotary mechanical forces;
    mounting means operable to rotatably mount said handgrip on said first control means; said mounting means comprising a first portion secured to said first control means and operable to rotably drive said first control means, and a second portion mounted on said handgrip; said first and second portions being rotatable with respect to each other; and a lost motion connection connecting said first and second portions for concurrent rotation to rotably drive said first control means when said first and second portions are moved in a first predetermined direction, and permitting relative movement therebetween when said first and second portions are rotated in a second predetermined direction, opposite said first predetermined direction; and
    second control means secured to said handgrip and operable to control a second device in response to the relative rotation of said first and second portions in said second predetermined direction;
    whereby said first and second control means are individually operated.

2. A motorcycle hand control for operation of both the handlebar mounted throttle and brake mechanisms of a motorcycle, by manipulation of a single handgrip control, comprising:
    a handgrip, including a gripping portion;
    mounting means operable to rotatably mount said handgrip on the throttle mechanism, said mounting means comprising a first portion operable to be secured to the throttle mechanism; a second portion mounted on said handgrip, said first and second portions being rotatable with respect to each other, and a lost motion connection engaging said first and second portions for concurrent rotation, when said first and second portions are moved in a first predetermined direction, and permitting relative movement therebetween when said first and second portions are rotated in a second predetermined direction, opposite said first predetermined direction; and
    a brake operating device secured to said handgrip and operable to actuate the brake mechanism of the motorcycle in response to the relative rotation of said first and second portions in said second predetermined direction.

3. The control of claim 2, wherein said brakeoperating device comprises:
    an eccentric cam mounted on said second portion;
    an elongated connector disposed for wrapping about said cam; and
    a brake lever connector operable to secure said elongated connector to said brake lever.

4. The control of claim 3, wherein said elongated connector comprises a chain and said brake lever connector comprises a clamp.

5. The control of claim 2 wherein said brake operating device comprises a toggle including
    a toggle crank secured to said handgrip; and
    a toggle rod having two end portions, a first end portion being pivotally secured to said crank and a second end portion being connected to the brake mechanism of the motorcycle.

6. The control of claim 5 wherein said toggle rod includes a bent center portion, and said crank includes a toggle rod receiving groove operable to receive said bent center portion therein.

7. The control of claim 2, 3, 4, 5 or 6 wherein said lost motion device comprises a pin mounted on said first portion and an arcuate clearance for said pin formed in said second portion.

* * * * *